United States Patent [19]
Burch et al.

[11] Patent Number: 5,539,785
[45] Date of Patent: Jul. 23, 1996

[54] JITTER/WANDER REDUCTION CIRCUIT FOR PULSE-STUFFED, SYNCHRONIZED DIGITAL COMMUNICATIONS

[75] Inventors: Richard A. Burch, Madison; Kevin W. Schneider, Huntsville; Michael D. Turner, Madison, all of Ala.

[73] Assignee: Adtran, Huntsville, Ala.

[21] Appl. No.: 281,461

[22] Filed: Jul. 27, 1994

[51] Int. Cl.⁶ ........................................... H04L 7/00
[52] U.S. Cl. ..................... 375/371; 375/363; 370/102
[58] Field of Search ........................... 375/362, 363, 375/371, 373, 374, 375; 370/105.3, 102, 100.1, 105.1, 102; 328/55, 72; 327/2, 146, 91, 94, 141, 155; 377/48

[56] References Cited

U.S. PATENT DOCUMENTS

| | | | |
|---|---|---|---|
| 3,812,430 | 5/1974 | Schmidt et al. | 370/102 |
| 4,731,646 | 3/1988 | Kliem | 375/363 |
| 4,792,966 | 12/1988 | Ballweg | 375/363 |
| 4,847,875 | 7/1989 | Choi | 375/363 |
| 5,235,531 | 8/1993 | Foerg | 377/48 |
| 5,313,502 | 5/1994 | Nawrocki et al. | 375/118 |

*Primary Examiner*—Stephen Chin
*Assistant Examiner*—Tesfaldet Bocure
*Attorney, Agent, or Firm*—Charles E. Wands

[57] ABSTRACT

A jitter/wander reduction circuit is provided for a desynchronizer deriving an output clock signal from an independent clock signal and phase adjustment signals. Phase adjustment signals relate to a deviation of the independent clock signal from an input clock signal. The circuit includes a frequency offset estimation circuit receiving phase adjustment signals and providing a frequency offset estimation signal. A phase controller receives the frequency offset estimation signal, provides a feedback signal to the frequency offset estimation circuit, and provides a phase difference signal. A clock generator circuit receives the independent clock signal and the phase difference signal. The independent clock signal is adjusted based on the phase difference signal to provide an output clock signal.

12 Claims, 3 Drawing Sheets

JITTER/WANDER REDUCTION CIRCUIT FOR PULSE-STUFFED, SYNCHRONIZED DIGITAL COMMUNICATIONS

FIELD OF THE INVENTION

The present invention relates in general to digital data communication systems and, more particularly, to a jitter and wander reduction circuit arrangement for a pulse stuffing desynchronizer, which is operative to maintain time synchronization accuracy within a prescribed maximum time interval error for a digital data stream interface wherein timing is distributed over a link.

BACKGROUND OF THE INVENTION

The current ANSI specification (ANSI T1.101 (1993)) sets forth maximum time interval error (MTIE) rate as the maximum allowed peak-to-peak variation between the phases of an input and a synthesized digital data clock over a prescribed time interval. Due to the strict MTIE synchronization accuracy measurement requirement provided in the above ANSI T1.101 specification, compliance problems may arise with respect to the digital data interface that is used to interface digital data received from a digital data link.

One technique to maintain synchronization in digital data communication systems, known as pulse stuffing, selectively inserts pulses into a digital data frame. As described in an article by V. I. Johannes et al, entitled: "Multiplexing of Asynchronous Digital Signals Using Pulse Stuffing with Added-Bit Signaling," IEEE Transactions on Communication Technology, pp. 562–568, October 1966, and an article by D. L. Duttweiler, entitled: "Waiting Time Jitter," Bell System Technical Journal, January 1972, pp. 165–207, the data clock produced at the output of a pulse-stuffing synchronizer, desynchronizer pair contains low frequency jitter, termed waiting time jitter, that cannot be fully removed using the standard phase locked loop filter on the output clock.

Because the receiver circuitry does not have access to the clock of the digital data symbol stream that it is receiving, the receiver must synthesize that clock from the information provided through either the presence or absence of the stuffed pulses. It is important that the synthesized clock be very consistent and regular if it is to be used to distribute network timing information.

In some applications the problem becomes worse because the stuffing pulses are longer than a single unit interval of the data clock. As a result, information passed to the clock smoothing circuit at the desynchronizer is rather coarse. (For a description of one non-limiting example of pulse stuffing, as applied to a high bit rate data service loop (HDSL), attention may be directed to the T1E1.4 HDSL Technical Report.)

Thus, there is currently a need for a clock smoothing circuit arrangement for complying with the maximum time interval error in accordance with the current ANSI T1.101 specification applied to a system incorporating pulse-stuffing synchronization, desynchronization, wherein a master oscillator is not locked to the clock driving the incoming or received digital data stream.

SUMMARY OF THE INVENTION

In accordance with the present invention, this need is satisfied by a jitter and wander reduction circuit for a desyncronizer that derives an output clock signal from an independent clock signal and phase adjustment signals, namely, a pulse stuffed signal. The phase adjustment signals relate to a deviation of a nominal clock, extracted from the independent clock signal, from an input clock signal.

To this end, the jitter and wander reduction circuit of the present invention includes a frequency offset estimation circuit receiving the phase adjustment signals and providing a frequency offset estimation signal. A phase controller receives the frequency offset estimation signal, provides a feedback signal to the frequency offset estimation circuit, and provides a phase difference signal. A clock generator circuit receives the independent clock signal and the phase difference signal. The independent clock signal is adjusted in accordance with the phase difference signal to provide an output clock signal.

An advantage of the jitter and wander reduction circuit is the fact that it averages out the phase adjustment signals and triggers the frequency estimation circuit on a number of unusual phase adjustments. A further advantage is the fact that it makes use of a threshold adaptation algorithm to account for any drift of the transmitter master oscillator which propagates through to the receiver. Yet another advantage of the present invention is the fact that residual phase information is used to cause the output clock to track the incoming phase adjustment information. As a result, the output of the jitter and wander reduction circuit according to the present invention has low wander in accordance with the MTIE specification and produces an output clock having very little high frequency jitter.

Other objects, advantages and novel features of the present invention will become apparent from the following detailed description of the invention when considered in conjunction with the accompanying drawings.

DETAILED DESCRIPTION

Figure 1:
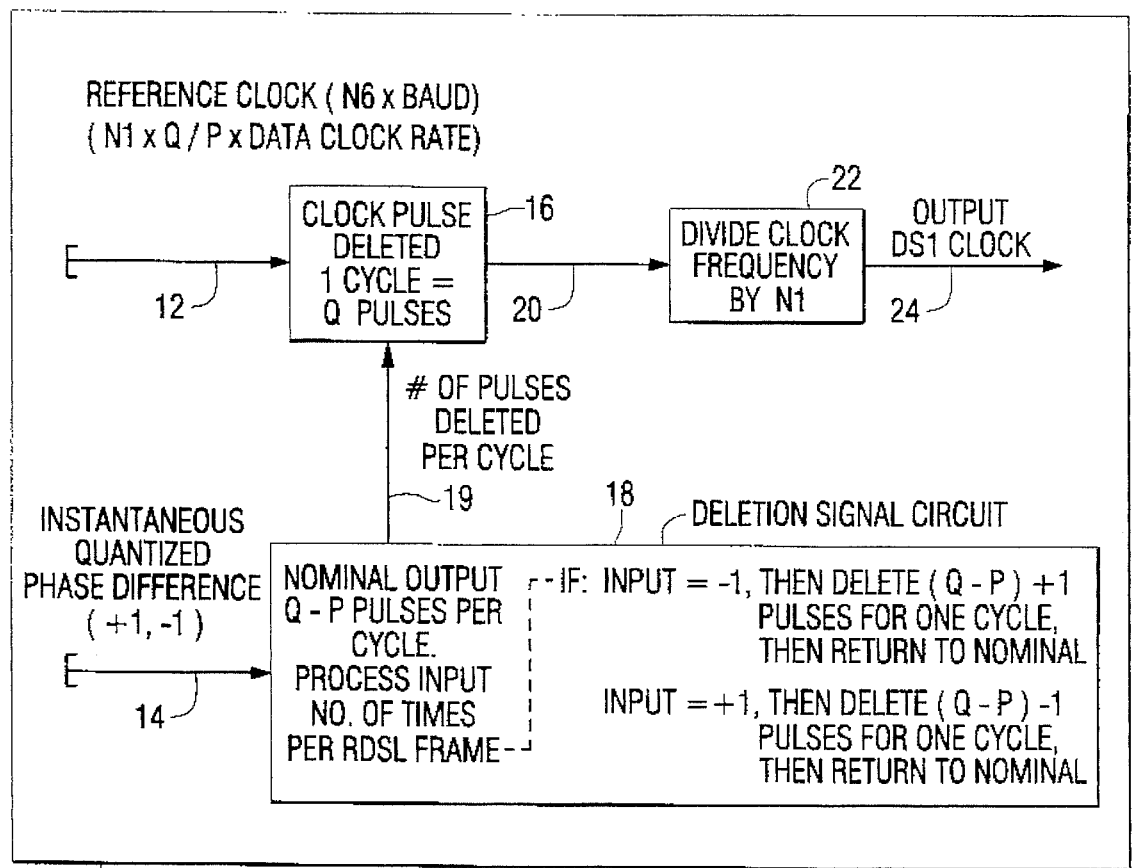
FIG. 1 is a schematic block diagram of a clock generator circuit.

Before describing in detail the particular improved jitter/wander reduction circuit arrangement in accordance with the present invention, it should be observed that the present invention resides primarily in a novel structural combination of conventional signal processing and communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood. In addition, the description below, the following definitions will be employed.

| | |
|---|---|
| Frame | The time between pulse stuff opportunities. Each frame has one pulse stuff opportunity. |
| Mini-frame | 1/N5 of a frame. |
| Stuff | The length in time of a stuffing pulse. |
| Mini-stuff | A step function phase adjustment of the data clock of 1/N5 of a stuff. |
| Stuff signal | A binary +/− 1 signal that indicates whether stuffing pulses were (1) or were not (−1) added to a particular frame. It is also referred to as stuff information, where stuff corresponds to a +1 and, no stuff corresponds to a −1. Note that a +1, or stuff indicates that the frame rate must be slowed to match that of the incoming data stream. |
| Mini-stuff signal | A ternary (−1,0,+1) signal that indicates whether or not to alter the phase of the output signal by one mini-stuff. A value of +1 indicates that a mini-stuff should be inserted, retarding the phase of the signal. A value of −1 indicates that a mini-stuff should be deleted, advancing the phase of the signal. A value of 0 indicates that the signal should continue at the nominal rate (defined below). |
| Nominal clock | The clock obtained from the reference clock by multiplying the P/Q/N1. This clock frequency is directly proportional to that of an master oscillator. Any variations or drift in the frequency of the master oscillator will show up in this clock. |
| Frequency offset | The difference between the frequency of the nominal clock and the incoming clock. Although it can be expressed in Hz, it is often expressed herein in dimensions of stuffs per frame or mini-stuffs per mini-frame. The frequency offset can change over time due to either changes in the incoming clock frequency or changes in the nominal clock frequency. The frequency offset must be in the range $-1 < f_o < 1$, where a value of −1 is the condition of never stuffing, which corresponds to a very fast incoming clock, and a value of +1 is the condition of always stuffing, which corresponds to a very slow clock. |
| Frequency estimate | (or more specifically, frequency offset estimate.) This is the estimate of the frequency offset that is made in the receiver by the jitter and wander reduction circuitry. |
| Unusual-stuff | A + or −1 in the stuff signal that deviates from an alternating (+1, −1, +1, −1,. . .) pattern. |

Figure 2:
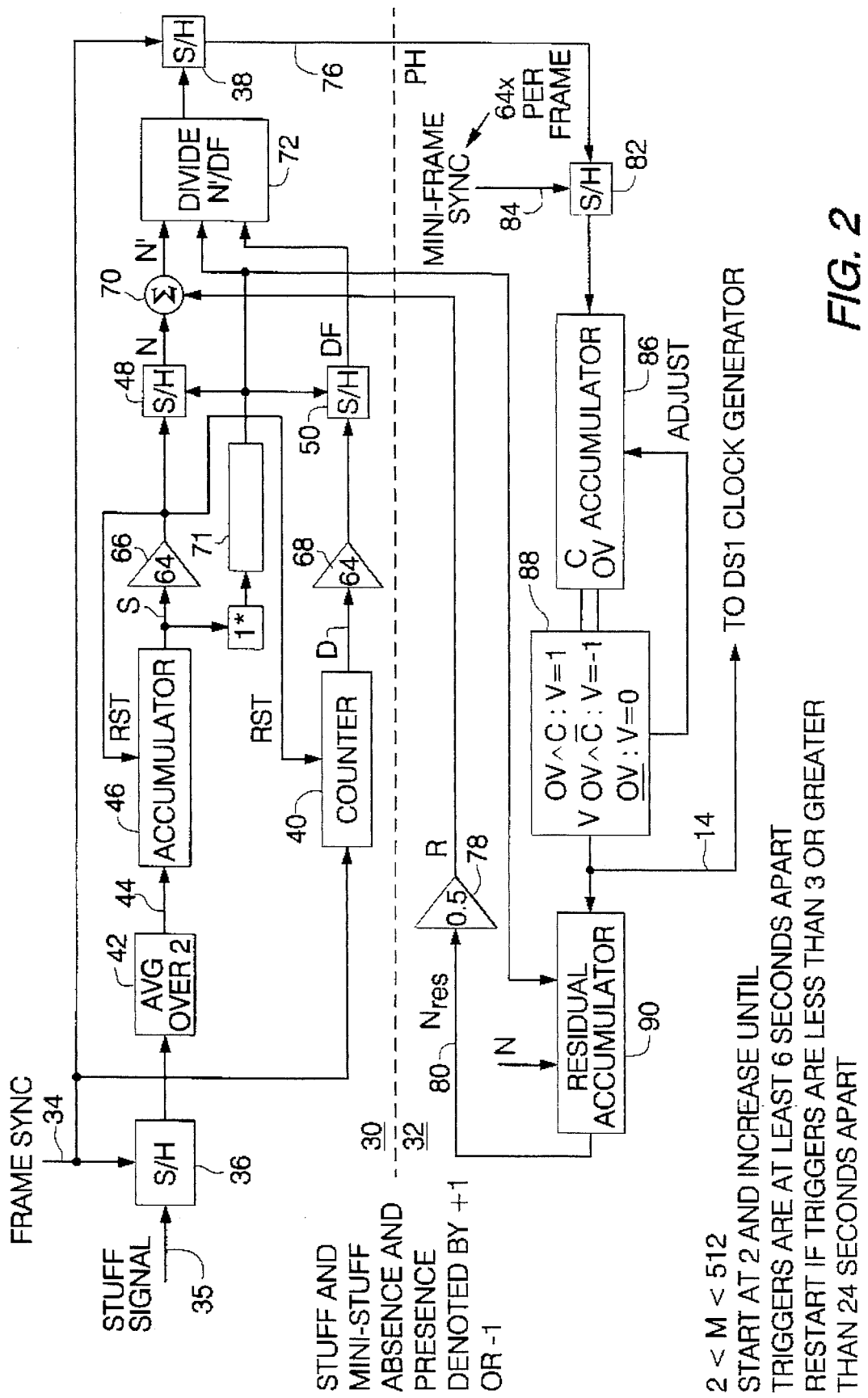
FIG. 2 is a schematic block diagram of a frequency offset estimation and phase controller circuit.

Referring now to the drawings, the jitter and wander reduction circuit of the present invention includes a clock generator (FIG. 1), and a frequency offset estimation circuit and phase controller circuit (FIG. 2).

Referring to FIG. 1, there is shown a clock generator 10 having an input 12 coupled to receive a reference clock, which is N6 times the frequency of and phase locked to the receiver baud clock, forming a replica of the transmitter's master oscillator. The clock generator may be readily implemented using digital logic circuitry in a programmable gate array. Absent any input from the phase controller which is supplied to the clock generator 10, as shown by input 14, (to be described), the clock generator 10 produces a nominal clock by deleting Q-P of every Q edges of the reference clock via a clock pulse deletion circuit 16 in accordance with a control input from a deletion signal circuit 18.

Clock pulse deletion circuit 16 produces a clock having a frequency of P/Q times the reference clock frequency as an output 20. This output 20 is coupled to a clock frequency divider 22, wherein the output is divided by N1 to produce an output clock signal 24. The instantaneous quantized phase difference input 14 to the deletion signal circuit 18 causes the clock generator 10 to deviate from a nominal clock pattern via signal 19, which indicates the number of clock pulses to be deleted per cycle.

For example, when the input signal 14 is raised high via a phase controller (to be described), the clock pulse deletion circuit 16 deletes (Q-P)−1 edges or pulses in a single cycle, i.e., a Q edge period, instead of the nominal (Q-P) pulses. Alternatively, if the input signal 14 is low, i.e., −1, then (Q-P)+1 clock pulses will be deleted instead of the nominal (Q-P) pulses. By varying the number of pulses to be deleted from the nominal level, one clock pulse is either deleted or inserted, which changes the phase of the output clock by one cycle of the reference clock, which has been defined to be one mini-stuff.

FIG. 2 is a schematic block diagram of a frequency offset estimation circuit 30 and a phase controller 32. Frequency offset estimation circuit 30 is activated via a frame synchronization signal 34, which provides the sampling signal to sample and hold circuits 36 and 38, and is also input to a counter 40. The input stuff signal 35 is the sampled input to the sample and hold circuit 36. The input stuff signal 35 is a bipolar binary stream (±1) which represents the presence or absence of stuffing pulses in each frame.

The output from the sample and hold circuit 36 is coupled to an averaging circuit 42. Averaging circuit 42 averages the sampled stuff signal 35 over two frames in order to filter out the normal oscillation of the signal between the +1 and −1 input which simply averages to zero. Averaging circuit 42 provides an average stuff signal output 44 from which an estimate of the frequency offset between the nominal clock and the incoming data clock is obtained.

After averaging the stuff signal 35 with the previous value in order to remove the alternating ±1 sequence, the averaged stuff signal output 44 from the averaging circuit 42 is supplied to an accumulator 46. Accumulator 46 accumulates a net stuff count which it provides as its output S. At the same time, counter 40 provides a frame count output D based on the number of frame synchronization signals 34 received. When the magnitude of the net stuff counts formed in accumulator 46 reaches a predefined threshold level M, accumulator 46 and counter 40 are Sampled via sample and hold circuits 48 and 50, respectively, thus producing output signals N and DF. The accumulator 46 and counter 40 are then reset via reset signal RST.

Figure 3:
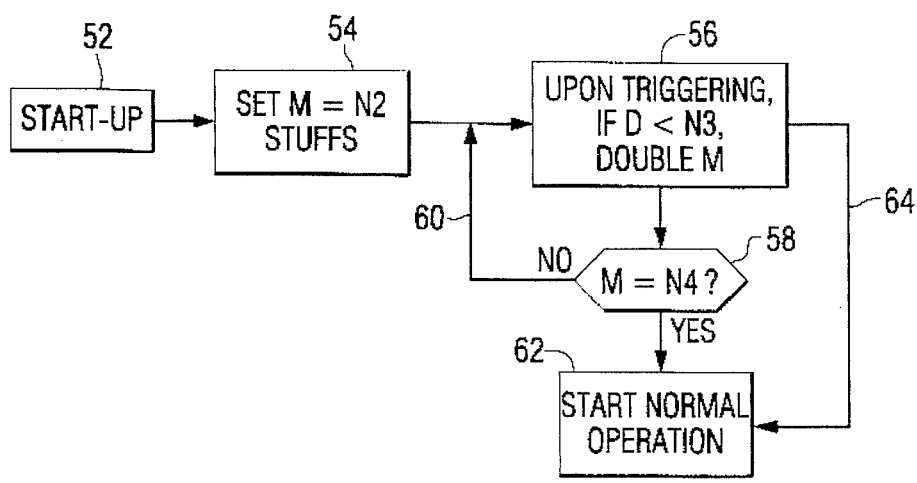
FIG. 3 is a schematic flow chart illustrating the operation of a threshold adaptation algorithm used in the present invention.

Referring to FIG. 3, the threshold adaptation algorithm begins at a start-up step 52, and then an initial value of M is set at step 54. The initial value of M may be set at a small nominal value, for example, two. Next, at step 56, the value of M is increased if the frame count D is less than N3, which is set to cause the frequency estimate to span a prescribed interval of time. In this case, the value of M is doubled at step 56. (A prescribed approximate value may be used as an empirical value that is tied to the drift rate of the master oscillator crystal.)

In step 58, the value of M is examined to determine whether it equals the maximum value N4. If not, then the algorithm loops back as indicated by line 60 where it then again checks the frame count D at step 56. However, if the value of M=N4, then the normal operation begins as indicated at step 60. Alternatively, if the frame count D is greater than or equal to N4, then normal operation again begins as indicated by line 64.

Referring again to FIG. 2, the stuff and frame counts, S and D, are fed to multipliers 66 and 68, respectively, where they are multiplied by the value N5. Since this value is a power of two, multiplication maybe readily effected by a left-shift of the bits involved. This multiplication occurs prior to the stuff and frame counts, S and D, being sampled by the sample and hold circuits 48 and 50. The stuff and frame counts are multiplied by N5 in order that the resulting sampled counts N and DF are provided in terms of mini-stuffs N and mini-frames DF, respectively.

The sampled mini-stuff value N from sample and hold circuit 48 is provided to a summation circuit 70. Summation circuit 70 also receives a residual mini-stuff signal R from the phase controller 32, as will be described. The summation circuit 70 adds the residual mini-stuff signal R to the sampled stuff count N to form an output value N'. Addition of the residual mini-stuff signal R keeps the jitter and wander reduction circuit locked to the stuff signal when the frequency offset varies.

The output N' from summation circuit 70 and the sampled frame count DF from sample and hold circuit 50 are supplied to a divider 72. An estimate of the frequency offset between the incoming data bit stream and the nominal data clock signal can be formed by dividing N' by DF. The divider 72 thus forms a frequency estimate as the ratio N'/DF, producing an estimate in units of mini-stuffs per mini-frame or, equivalently, stuffs per frame. This output is provided to the phase controller 32 through the sample and hold circuit 38.

A trigger circuit 74 for triggering the operation of the frequency estimator 30 and the phase controller 32 has as its input an absolute value signal from the net stuff count S. The trigger circuit 74 provides sample time to sample and hold circuits 48, 50, divider 72 and a residual accumulator 90 (described below).

The frequency estimate output from sample and hold circuit 38 is provided as an input 76 to the phase controller 32. This estimate 76 is used by the phase controller 32 to output stuffs at the rate of N' mini-stuffs in DF mini-frames. The residual mini-stuff signal R can be viewed as the negative feedback in the control loop. An amplifier 78 provides a prescribed low value of gain in the feedback path 80.

The phase controller 32 uses the frequency offset estimate 76 from the frequency estimator circuit 30 to schedule the N' mini-stuffs over the next DF mini-frames. The frequency offset 76 is provided to a sample and hold circuit 82, which also receives as an input a mini-frame synchronization signal 84. The output from sample and hold circuit 82 is supplied to an accumulator circuit 86, which accumulates the frequency offset estimate from the sample and hold circuit 82 N5 times per frame, i.e., once per mini-frame. When the accumulator 86 overflows, a signal 14 is provided to the clock generator 10 (FIG. 1) in accordance with the logic set forth in block 88.

As described above with reference to FIG. 1, the signal 14 instructs the clock generator to insert or delete one mini-stuff. If the accumulator 86 overflows in the positive direction, then the clock generator is instructed to insert a mini-stuff. When the accumulator overflows in the negative direction, the clock generator is instructed to delete a mini-stuff. When a mini-stuff is inserted or deleted from the output clock 24 of the clock generator 10 (FIG. 1), the phase accumulator 86 is adjusted by ± one mini-stuff.

The output from the logic 88 of the phase controller 32 is also provided to a residual accumulator 90. Residual accumulator 90 forms the residual mini-stuff signal $N_{res}$ (80) that is scaled by gain block 78 and fed back to the frequency estimation circuit 30. The purpose of this residual mini-stuff count $N_{res}$ is to keep the phase controller locked to the stuff information. Therefore, the residual accumulator 90 is based on the value of N, i.e., the stuff count, rather than N'.

The residual mini-stuff count may be formed from the following expression:

$$N_{res}=N-N_{done}$$

wherein $N_{res}$ is the residual mini-stuff count and $N_{done}$ is the net number of mini-stuffs actually output since the last threshold triggering. $N_{done}$ is computed by accumulating the signal V.

Figure 4:
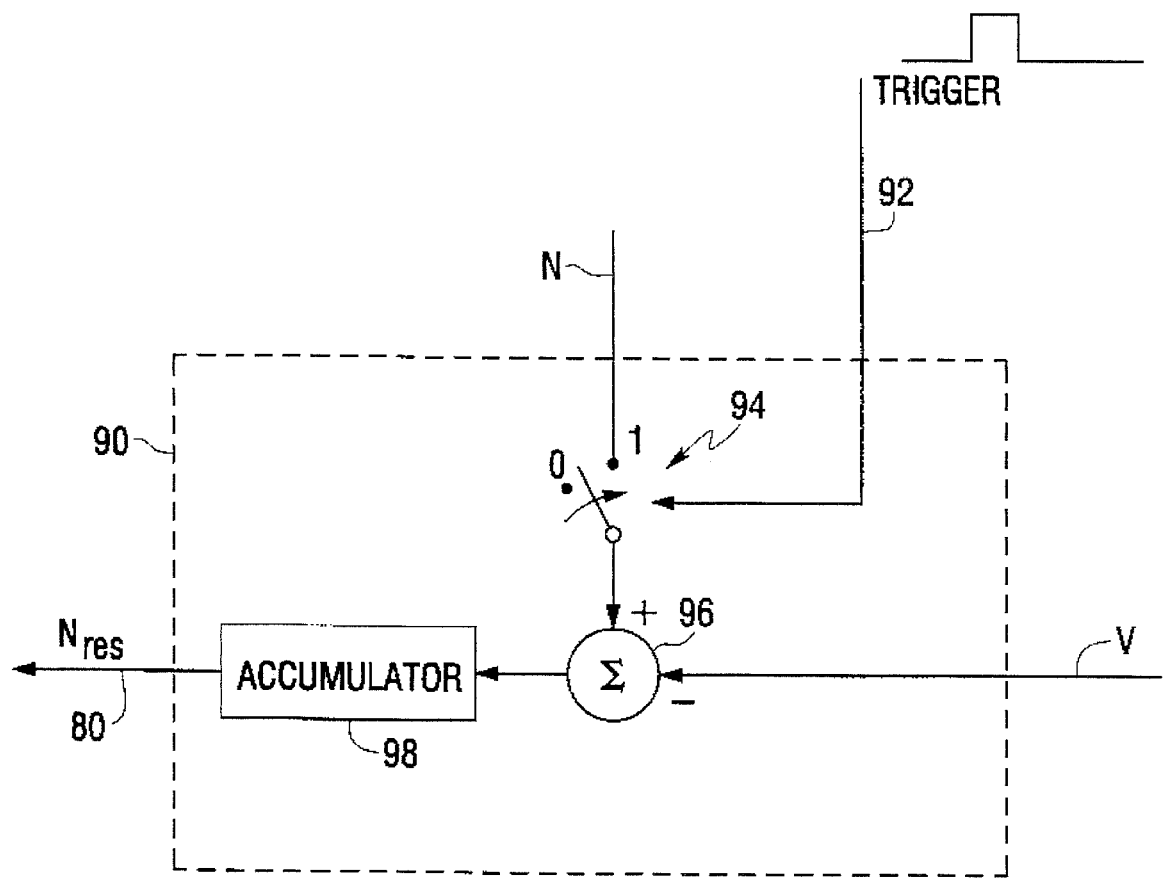
FIG. 4 is a schematic block diagram of the residual accumulator of FIG. 2.

FIG. 4 diagrammatically illustrates the configuration of the residual accumulator 90. The residual accumulator 90 receives as its input the signal V from logic 88 in the phase controller 32. Also, the residual accumulator is provided with the trigger input 92 from the trigger circuit 74 in the frequency estimator 30. The stuff count N is also provided to the residual accumulator 90, which computes $N_{res}=N-N_{done}=N-$(accumulated V).

A switch 94 in the residual accumulator 90 operates to sample a new stuff count value N in response to the trigger pulse 92. This value N is added to the accumulator output V in the summation circuit 96. Each time a new mini-stuff is output, i.e, V does not equal 0, it is subtracted from the stuff count value N. Ideally, between trigger pulses 92, the accumulated mini-stuff total equals the value N, and the residual equals 0. If, however, the residual value is equal to zero, then half of the residual value is added into the next stuff count value N to arrive at the value N' as shown via summation circuit 70 in FIG. 1. The output from the summation circuit 96 is coupled to an accumulator 98 which outputs the residual mini-stuff value $N_{res}$.

The jitter and wander reduction circuit according to the present invention is able to control the amount of averaging in the frequency estimate by adjusting the threshold value M for detecting multiple unusual-stuffs. By keeping the averaging time long enough to be accurate while short enough to include only that stuff information that reflects the current frequency offset, an optimum circuit is provided.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A jitter and wander reduction circuit for a receiver deriving an output clock signal from an independent clock signal, and phase adjustment signals relate to a deviation of said independent clock signal from an input clock signal, comprising:

a frequency offset estimation circuit receiving said phase adjustment signals and providing a frequency offset estimation signal;

a phase controller receiving said frequency offset estimation signal and providing a feedback signal to said frequency offset estimation circuit, and a phase difference signal; and a clock generator circuit receiving said independent clock signal and said phase difference signal, said independent clock signal being adjusted based on said phase difference signal to provide an output clock signal.

2. A jitter and wander reduction circuit according to claim 1, wherein said frequency offset estimation circuit comprises:

a first sample/hold circuit having as inputs a frame synchronization signal and said phase adjustment signals, said sample/hold circuit obtaining a new phase adjustment signal with each frame;

an averaging circuit coupled to said sample/hold circuit for averaging said new phase adjustment signal with a previous phase adjustment signal to provide averaged phase adjustment signals;

an accumulator receiving said averaged phase adjustment signals and providing as an output a net phase adjustment signal count;

a counter receiving said frame synchronization signal and providing as an output a frame count;

a trigger circuit having as an input said net phase adjustment signal count and providing as an output a trigger signal;

a second sample/hold circuit for sampling said net phase adjustment signal count in response to said trigger signal and providing as an output a sampled net phase adjustment signal count;

a third sample/hold circuit for sampling said frame count in response to said trigger signal and providing as an output a sampled frame count;

a summation circuit for adding said sampled net phase adjustment signal count to said feedback signal from said phase controller to provide as an output an adjusted phase adjustment signal count; and a divider circuit for dividing said adjusted phase adjustment signal count by said sampled frame count to provide said frequency offset estimate signal.

3. A jitter and wander reduction circuit according to claim 2, wherein said phase controller comprises:

a phase accumulator having as an input said frequency offset estimate signal, said phase accumulator accumulating said frequency offset estimate signals received from said frequency offset estimation circuit and providing an overflow signal output;

a logic circuit which receives said overflow signal output and provides as an output said phase difference signal; and a residual accumulator receiving said phase difference signal, said trigger signal, and said sampled net phase adjustment signal count and providing as an output said feedback signal.

4. A jitter and wander reduction circuit according to claim 3, wherein said residual accumulator comprises:

a summation circuit having as a first input said phase different signal;

a switch activated via said trigger signal to couple said sampled net phase adjustment signal count as a second input to said summation circuit; and an output accumulator receiving an output from said summation circuit and providing as an output said feedback signal.

5. A jitter and wander reduction circuit according to claim 4, wherein said feedback signal is a residual signal, said residual signal being filtered through an amplifier in a feedback path before being received by said frequency offset estimation circuit.

6. A jitter and wander reduction circuit according to claim 3, wherein said trigger circuit outputs its trigger signal to sample said accumulator and said counter in said frequency offset estimation circuit when a threshold value is reached.

7. A jitter and wander reduction circuit according to claim 6, wherein said threshold value is initially set as a small value.

8. A jitter and wander reduction circuit according to claim 7, wherein said threshold value increases in accordance with a threshold adaptation algorithm.

9. A jitter and wander reduction circuit according to claim 3, wherein said clock generator circuit comprises:

a clock pulse deleter receiving said independent clock signal and a pulse deletion signal and providing as an output a deleted clock signal;

a deletion signal generating logic circuit which receives as an input said phase difference signal and provides as an output said pulse deletion signal; and a frequency divider receiving said deleted clock signal and providing as an output said output clock signal.

10. A jitter and wander reduction circuit according to claim 9, wherein said receiver is a high speed data service loop receiver having a clock signal as said independent clock signal, and wherein said phase adjustment signals are binary signals indicating whether step function phase adjustments of said input clock signal were added to a digital data frame transmitted across a loop to said receiver.

11. A jitter and wander reduction circuit according to claim 10, wherein said frequency estimation circuit further comprises:

a first multiplier coupled between said accumulator and said second sample/hold circuit; and a second multiplier coupled between said counter and said third sample/hold circuit.

12. A method for complying with maximum time interval error specifications for an output clock signal derived from received frame information transmitted over a digital data communications link, comprising the steps of:

(a) forming a frequency offset estimate using received stuff signals from said frame information;

(b) providing said frequency offset estimate to a phase controller circuit;

(c) locking said output clock signal via said phase controller circuit to said received stuff signals by using residual phase information from said phase controller circuit in step (a); and (d) signalling a clock generator circuit from said phase controller circuit to advance or retard the phase of said output clock signal based on said frequency offset estimate.

\* \* \* \* \*